United States Patent [19]

Chiang

[11] Patent Number: 4,816,344

[45] Date of Patent: Mar. 28, 1989

[54] PREPARATION OF FLUORESCENT THERMAL TRANSFER RIBBON

[75] Inventor: Albert C. Chiang, Danbury, Conn.

[73] Assignee: Pitney Bowes Inc., Stamford, Conn.

[21] Appl. No.: 940,303

[22] Filed: Dec. 10, 1986

Related U.S. Application Data

[62] Division of Ser. No. 818,937, Jan. 15, 1986, Pat. No. 4,657,697.

[51] Int. Cl.$^4$ .............................................. B41M 3/14
[52] U.S. Cl. .................... 428/483; 427/146; 427/153; 427/157; 428/690; 428/914
[58] Field of Search .............. 252/301.3; 427/48, 157, 427/146, 153; 428/914, 332, 483, 690; 106/21, 22

[56] References Cited

U.S. PATENT DOCUMENTS

| | | | |
|---|---|---|---|
| 2,629,956 | 3/1953 | Switzer | 427/157 |
| 3,804,774 | 4/1974 | Betts et al. | 427/157 |
| 4,172,064 | 10/1979 | Keeler | 260/296 A |
| 4,472,479 | 9/1984 | Hayes et al. | 427/157 |
| 4,492,778 | 1/1985 | Claussen | 523/137 |

FOREIGN PATENT DOCUMENTS 0054598  9/1982  Japan ................... 427/152

*Primary Examiner*—Janyce Bell
*Attorney, Agent, or Firm*—Peter Vrahotes; Melvin J. Scolnick; David E. Pitchenik

[57] ABSTRACT

A method for the preparation of a fluorescent ink layer for a fluorescent thermal transfer sheet is disclosed. The method comprises first forming a solution of a mixture comprising at least one acidic monomer, at least one basic monomer and at least one fluorescent dye. Thereafter, an emulsion of the solution is formed and the emulsion is polymerized.

7 Claims, No Drawings

PREPARATION OF FLUORESCENT THERMAL TRANSFER RIBBON

This application is a division of Ser. No. 06/818,937 filed 01/15/87, now U.S. Pat. No. 4,657,697.

BACKGROUND OF THE DISCLOSURE

I. Field of the Invention

This invention is concerned with a ribbon or tape for use in non-impact printing, and more particularly, to a method for the preparation of a fluorescent ink coating that is applied to a ribbon to make a fluorescent thermal transfer ribbon. The method by which the fluorescent ink coating is made is a monomer polymerization method.

II. Description of the Prior Art

It is known in prior art to use ribbons in thermal transfer imaging processes. In these processes, thermal means are used to selectively heat areas of ribbon having an image transfer layer or coating. The printing is generally achieved by heat transferring the coating from the ribbon to paper by the local heating of the ribbon. Such image-localized heating may be accomplished by contacting the ribbon with point electrodes or some sort of heating element and a broad area contact electrode or heating element. The high current densities in the area of the electrodes during the application of the applied voltage produces intense local heating which causes transfer of the coating frrom the ribbon to either paper or any receiving medium adjacent to or in contact with the ribbon. Various publications such as IBM Technical Disclosure Bulletin entitled "Resistive Ribbon Thermal Transfer Printing Method", Crooks, et al., vol. 19, No. 11, April, 1977, p. 4396 illustrate this general thermal transfer technique. Printers and various other hardware used in these methods are disclosed in, for example, U.S. Pat. Nos. 4,326,812; 4,327,365 and 4,329,071.

The ink and substrate are basically the keys to a thermal transfer technique. Various known prior art substrates have been used including Mylar, condenser paper, other polyesters and conductive polyurethanes. Of these, two substrates are most commonly used, i.e., Mylar and special condenser paper. Mylar is a registered trademark of DuPont. The preferred Mylar ranges in thickness from about 3.5 to 6 microns and the special condenser paper ranges in thickness from about 10 to 13 microns. Condenser paper is used in thermal line printers in widths ranging from about 33 to 267 mm. (The low tear strength of the condenser paper precludes its use for narrower ribbons.) Polyester film like Mylar is found in thermal serial printers in common widths of about 6.35, 8.0 and 12.7 mm. The length of both condenser paper and polyester film depends upon the space available in the printer or ribbon cassettes. There are other substrates known to be adapted for use in thermal transfer ribbons such as those are described in U.S. Pat. Nos. 4,103,066, 4,269,892, 4,291,994 and 4,320,170.

In the machine processing of various types of information contained on tickets, tags, labels, postage imprints and the like, it is generally known to employ detectors which are responsive to shape relationships and/or colors, and in many cases to the fluorescence of an ink which may be excited, for example, by ultraviolet light. Fluorescent inks and dyes have long been known such as, for example, those disclosed in U.S. Pat. Nos. 2,681,317, 2,763,785, 3,230,221, 3,412,104, 3,452,075, and 3,560,238. The fluorescent inks and the methods of making or using them as known in the prior art, generally entail the use of a fluorescent ink which, when irradiated, will fluoresce and emit radiation within the wavelength for the particular fluorescent color of that dye or ink. It is known, for example, in the postage meter art to provide a red fluorescent ink for machine reading of processed mail.

It is therefore desirable to provide a thermal transfer ribbon having a fluorescent ink layer thereon so that items such as tickets, tags, labels, postage imprints and the like can be imprinted with indicia such as alphanumerics, bar code, slogans etc., by the use of such fluorescent thermal transfer ribbon. However, known prior art methods used for the preparation of fluorescent inks generally use a technique that employs a dispersion of resins and dyes. This type of technique has the following disadvantages: (1) It produces an ink with an inhomogeneous dye distribution. (2) It produces an ink having a large dye particle size (3-30 m) and a broad particle size distribution. (3) It also produces an ink that prints a fluorescent image having a weak intensity of fluorescence and, in general, a short life time of fluorescence.

In U.S. Pat. No. 4,172,064, there is disclosed an aqueous copolymer coating system adapted for forming abrasionresistant coatings using either printing or coating processes. The copolymer employed in the coating system includes: (1) a four component (monomer) copolymer comprising: (1) an alkyl methacrylate, (2) an alkyl acrylate, (3) unsaturated nitrile, and (4) unsaturated organic acid; (b) at least one coalescing agent for the ether-alcohol types; (3) at least one surfactant agent which may be either of the substituted polyether nonionic type or one of a group of selected anionic agents; and (d) one or more additives as may be necessary to impart color, control foam, and prevent mildew and/or fungus attack. Basically, this patent is concerned with printing ink copolymers and has no disclosure or suggestion of the idea of a fluorescent coating or printing an indicia which is fluorescent. Furthermore, unlike the present invention, the process described by this patent (i) does not involve a chamical reaction between the dyes and monomers, i.e., a chemical bonding between dye and basic monomer resulting in stronger intensity and longer lifetime of fluorescence, (ii) does not treat a fluorescent dye with an acid monomer to put the dye in acidic form followed by treatment with a basic monomer and (iii) does not describe a fluorescent dye which is incorporated in the monomers (describes a dye dispersed in an emulsion medium).

SUMMARY OF THE INVENTION

It is therefore an object of the present invention to provide an improved method for the preparation of a fluorescent ink layer for a fluorescent thermal transfer sheet that is substantially devoid of the above-noted disadvantages.

Another object of the present invention is to provide a method for the preparation of an improved fluorescent ink layer which when used to manufacture a fluorescent thermal transfer sheet used in printing, results in a relatively high intensity of fluorescence and a relatively long lifetime of the fluorescent dyes.

A further object of the present invention is to provide a method for the preparation of a fluorescent ink layer for a fluorescent thermal transfer sheet which employs an emulsion polymerization process whereby a homogeneous distribution of the dyes in the resins is obtained.

A further object of the present invention is to provide a method for the preparation of a fluorescent ink layer for a fluorescent thermal transfer sheet wherein there is a chemical bonding between the fluorecent dyes and resins which improves the overall fluorescent lifetime of the dyes.

Still another object of the present invention is to provide a method for the preparation of a fluorescent ink layer for a fluorescent thermal transfer sheet wherein an acid monomer is first added to the dye to assist the dye to react and form an acidic group on the dye structure which subsequently assists the reaction of the dye with a basic monomer, thereby helping to increase the overall intensity of the fluorescence.

It is still another object of the present invention to provide a method for the preparation of a fluorescent ink layer for a fluorescent thermal transfer sheet which provides for the adjustment of certain properties of the ink layer such as tackiness, general coating characteristics, thermal transfer temperature, stability of the emulsion, etc.

Still another object of this invention is to provide a method for the preparation of a fluorescent ink layer for a fluorescent thermal transfer sheet which additionally provides for adding such materials as, for example, a charge modifier to improve the surface contact with plain paper and a cross linking agent to increase the stability of the printed image.

The foregoing objects and others are accomplished in accordance with the present invention by providing a method for the preparation of a fluorescent ink layer for a fluorescent thermal transfer sheet comprising the following steps: First, a solution is formed of a mixture comprising at least one acidic monomer, at least one basic monomer and at least one fluorescent dye. An emulsion of this solution is formed and the emulsion is polymerized. The emulsion is actually a neutralized emulsion that is formed by (1) mixing together at least one acidic monomer and at least one fluorescent dye; (2) adding at least one basic monomer to the mixture of the acidic monomer(s) and fluorescent dye(s), and then (3) adding an emulsifier to this mixture to form an emulsion which is subsequently polymerized.

In accordance with the preferred features of the method of this invention, a sufficient amount of one or more basic monomers is added to the fluorescent dye(s) for the purpose of chemically reacting with the dye(s) (chemically bonding of the dye and basic monomer). Any excess basic monomer (or unreacted basic monomer) will then chemically react with the subsequently added acid monomer(s) to form an ester monomer. The express purpose of adding the acid monomer is to have the dye react and form an acidic group (COOH) on the dye structure which assists the reaction of the dye with the excess basic monomer. In accordance with the preferred features of the method of the present invention, the acid monomer(s) reacts with the basic monomer(s) to increase the intensity of the fluorescence and the overally lifetime of the fluorescent image. Thus, not only does the fluorescent ink layer obtain a very high intensity of fluorescence, but there is produced an extremely stable fluorescence under either ultraviolet or regular light.

DESCRIPTION OF THE PREFERRED EMBODIMENTS

In accordance with the method and resulting fluorescent ink layer composition as defined by the present invention, machine readable tickets, tags, labels, postage imprints and the like can be provided with a fluorescent image that can be read visually or by a number of existing machines that can be used for reading fluorescent ink imprinted information.

In accordance with the features of the present invention, the method involves the following general steps: (1) First, there is the step of mixing an emulsifier with water (preferably distilled water) at about room temperature. Various types of ionic and non-ionic emulsifiers can be used such as, for example, Triton X-200, Triton X-301, Triton X-305, Triton X-405, Triton Gr-5, Triton QS-44, Triton CF-32, Aerosol A-103 and Aerosol A-102. (2) Second, in a separate container one or more acidic monomers are mixed with one or more fluorescent dyes at about room temperature. In accordance with the preferred features of the present invention, about 2 to 5 times the ratio of acid monomer(s) to fluorescent dye(s) is used (2:1 to 5:1). Stirring is performed for a preferred period of about 5 to 30 minutes. Preferred acid monomers include an acid monomer having the general formula:

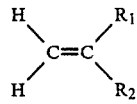

where $R_1$ is H, $CH_3$ and $R_2$ is COOH, $R_3$ COOH wherein $R_3$ is $C_1$-$C_8$. Examples of these acid monomers include acrylic acid, maleic acid and p-vinyl benzoic acid.

The preferred fluorescent dyes useful in the method of the present invention are chosen based upon the fluorescent color that they exhibit and are preferably aromatic organic dyes such as Rhodamine Bx, Rhodamine B, Phthalocyamine, Alkali Blue G, Phthalocyamine, Rhodamine 7G, Rhodamine FB, Rhodamine S, Rhodamine 6 GDN, Rhodamine 5G, Bright Yellow 3G, Tteramethyl Rhodamine, Isothiocyanate, Rhodamine FG, Rhodamine F4G, Fanal Pink D, Fanal Violet D, Flexo Yellow 110, Lumogen Yellow D, Fluorol Green gold, Fluorol Yellow and Thermoplast F-Orange (3) In the third step, one or more basic monomers are added to the acidic monomer—fluorescent dye mixture, and the entire mixture is stirred at room temperature for about 10 to 30 minutes. Basically, the amount (moles) of basic monomer that is added to the mixture is equal to or greater than the amount (moles) of the combined amount of acidic monomer and dye.

The preferred basic monomers used are those having the general formula:

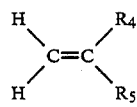

wherein $R_4$ is H, $CH_3$ and $R_5$ is OH, $R_6$ OH wherein $R_6$ is $C_1$-$C_8$. Examples of such basic monomers include hydroxyl ethyl methacrylate, hydroxyl methyl methacrylate, hydroxyl prophyl methacrylate hydroxyl ethyl acrylate, hydroxyl methyl acrylate, hydroxyl propyl acrylate, eugenol and vinyl alcohol.

(4) Thereafter, the emulsifier is added to the monomer—fluorescent dye combination to create an emulsion. Basically, this is done by stirring the ingredients for a period ranging from about 10 minutes to about 30 minutes at about 200 to 400 rpm to form a homogeneous emulsion (5) One of the additional features in accordance with the method of the present invention involves including additional monomers to the emulsion when it is desired to provide to the ink layer of the fluorescent thermal transfer sheet improved properties of heat transfer and surface energy. Adjusting the heat transfer properties is related to the energy requirements of the thermal print head that will eventually be used with the transfer sheet. Adjusting the surface energy is related to the surface of the substrate that will be printed on, e.g., paper, plastic film, etc. Examples of the preferred additional monomers that can be added to the emulsion to accomplish this result include vinyl monomers such as, for example, styrene, u-methyl styrene, vinyl toluene, methyl methacrylate, butyl acrylate, ethyl acrylate, propyl acrylate acrylnitrile and vinyl acetate.

At this point in the method the total percentage by weight of acidic monomers, basic monomers, other monomers and fluorescent dyes in the total emulsified mixture is as follows: acidic monomers 20-40 percent, fluorescent dyes 1-10 percent, basic monomers 30-50 percent, other vinyl monomers 0-50 percent;

(6) The next step in the process is the polymerization of the emulsion. In accordance with the preferred embodiments of the present invention, the emulsion can be polymerized at room or at elevated temperatures by (i) adding an initiator with or without a reducing agent to the emulsion, or (ii) by just heating the emulsion at a temperature of about 60° to 70° C. and stirring for about 5 hours. Examples of the optional reducing agents which can be used include sulfite compounds such as sodium metabisulfite or sodium thiosulfite which basically accelerate the polymerization process. Examples of initiators which are used to initiate the polymerization process include persulfates and peroxides such as potassium persulfate, ammonium persulfate, benzoyl peroxide and AlBN.

(7) Thereafter the solution is filtered through a material such as cheese cloth, and the fluorescent material is coated onto a proper support substrate. In accordance with the preferred features of the present invention, various types of known prior art substrates can be used including Mylar, condenser paper and other polyesters and conductive polyurethanes. Of these, two substrates that are most commonly used include Mylar and special condenser paper. In accordance with the features of the present invention, Mylar substrates are preferred. The Mylar (from DuPont) can range in thickness from about 5 to 10 microns.

There are several other ingredients that can optionally be added during the process to achieve certain desired end results. For example, molecular weight modifiers can be added for the purpose of decreasing the molecular weight which results in decreasing the transfer temperature of the fluorescent coating. These modifiers could include sulfur containing compounds such as, for example, n-octyl mercaptan and n-dodecyl mercaptan. For the purpose of stablizing the emulsion and also improving transfer properties, charge modifiers can be added. Examples of this type of material include quartery ammonium salts such as, for example, methacrylamidopropyl trimethyl ammonium chloride and 2-trimethylammonium ethyl methacrylic chloride. To improve the overall filming or coating characteristics of the fluorescent material a plasticizer in the form of an ester or polymer can be added. Examples of those plasticizers which are particularly suitable for the present invention include polypropylene glycol, tricresyl phosphate, dioctyl phthalate, trioctyl phosphate, dioctyl sebacate, dibutyl phthalate, dibutyl sebacate and tributhyl phosphate. To stabilize the image that is transferred, a cross linking agent formed of an organic acid or an anhydride can be added. Examples of such cross linking agents include polyethylene maleic anhydride, oxalic acid, malonic acid, adipic acid, fumaric acid, acetic anhydride, fuccinic anhydride and maleic anhydride. A general example of the procedure that is followed in performing a preferred method in accordance with the present invention for preparing a fluorescent thermal transfer sheet by monomer polymerization is as follows:

It is to be noted that both in the general example and the examples described below any percentage figure listed is weight percent unless otherwise stated.

An amount of emulsifier ranging from about 5 to 15% is added into a resin reaction vessel which contains distilled or deionized water. In a separate container, about 0.5 to 5% of fluorescent dye(s), 2 to 20% of acidic vinyl monomer(s) and 4 to 30% of basic vinyl monomer(s) are mixed together for a preferred period of about 5 to 30 minutes for the purpose of insuring the incorporation of the fluorescent dye(s) into the monomer(s). Thereafter, about 30 to 70% of additional vinyl monomer(s), 0 to 5% of charge modifier(s), 0 to 5% of plasticizer(s) and 0 to 5% of molecular weight modifier(s) are added into the container, and all of these ingredients are mixed together. This mixture is slowly added into the reaction vessel during a preferred period of about 10 minutes to 60 minutes under mechanical stirring conditions (a mechanical stirrer having a speed of about 200 rpm to 500 rpm). Inert gas is bubbled through the mixture for a period ranging from about 10 to 30 minutes. 0.1 to 5% of an initiator is then slowly added into the reaction vessel during a period ranging from about 5 to 20 minutes. With or without the addition of one or more reducing agents (in an amount ranging up to about 5%), the reaction mixture is heated to a temperture ranging from about 4° C. to 90° C. for a period ranging from about 2 to 6 hours to initiate and complete the polymerization step. From about up to 5% of extra initiators and/or reduction agents is added to the mixture to complete the reaction during the end of the polymerization process. The final product obtained by this procedure is then preferably mixed with a low molecular weight polyethylene emulsion and/or polyester, and coated onto a substrate such as Mylar or condensed paper. The coated film is then dried and can be supercalendered to insure the smoothness of the coating surface. The following Examples are exemplary of the invention and should not be considered limiting.

EXAMPLE 1 (ONE STEP MONOMER ADDITION METHOD)

50 ml of Triton X-305 (70% solid content from Rohmn and Haas Company) was transferred to a one liter, four-necked resin reaction vessel which contained 270 ml of dionized water. The acqueous solution was continuously stirred and bubbled with nitrogen gas. A 150 ml flask was used to mix one gram of Rhodamine 6 GDN and 7 ml of acrylic acid. After stirring the mixture for 10 minutes, 13 ml of hydroxyethyl methacrylate was added, and the mixture was stirred for 15 minutes. A monomer mixture combining 80 ml of styrene, 25 ml of butylacrylate, 3 ml of methacrylamino propyl trimethyl ammonium chloride, 2 ml dodecyl mercaptan and 1 ml dioctyl phthalate was mixed with the dye mixture. The resulting mixture was then transferred to the resin vessel within a 60 minute period through a drop regulator during stirring. The monomer emulsion was thus formed. An initiator mixture was formed with 4 grams of potassium persulfate, 10 ml of water and 1 ml of Triton X-305 which was slowly added into the monomer emulsion to initiate the polymerization. A reducing agent comprised of 5 grams of sodium metabisulfite in 20 ml of water was added to the emulsion to accelerate the reaction. The reaction was completed after about 5 hours of continuously stirring the mixture and bubbling it with nitrogen. 50 ml of the final product was used and added to 30 ml of low molecular weight polyethylene (Poly emulsion 656 A25, from Chemical Corp.) and 5 ml of high molecular weight polyethlene (Poly emulsion 2-67 A, from Chemical Corp.) for the subsequent coating of the fluorescent material onto Mylar film (from DuPont). Several coating methods including doctor blade coating, gravure coating, kiss coating and rod coating were used to obtain the fluorescent thermal transfer film on the Mylar substrate. Good thermal transfer properties were found by developing an image through a facsimile thermal printing head (Pitney Bowes Model 8400 facsimile). The fluorescence was strong and stable without fading under exposure to ultraviolet light for an extended period of time.

EXAMPLE 2 (TWO STEP MONOMER ADDITION METHOD).

An amount of 80 ml of Triton X-200 (28% solid content from Rohmn and Haas Company) was added into a one liter, 4-necked reaction vessel which contained 400 ml of dionized water. The acqueous solution was continuously mechanically stirred at 300 rpm and bubbled through with nitrogen gas. A 100 ml flask was used to prepare the monomer mixture. Two grams of Rhodamine 6 GDN (from BASF Wyandotte Corp.) was mixed with 8 ml of acrylate acid. After magnetically stirring the solution for 10 minutes, 15 ml of 2-hydroethyl methacrylate was added. The mixture was then stirred for 15 minutes to form an emulsion. 25 ml styrene and 1 ml N-trimethyl ammonium propyl methacrylate chloride were added into the mixture. The mixture was slowly added into the reaction vessel through a drop regulator during a 30 minute period while continuously stirring.

In a separate flask, 60 ml of styrene and 40 ml of butylacrylate were combined. This combination was then added into the reaction vessel during a 30 minute period. The formation of a monomer emulsion was then completed. A mixture of 6 grams of ammonium persulfate, 20 ml of dionized water and 4 ml of Triton X-200 were slowly added into the monomer emulsion to initiate the reaction. To begin and to accelerate the polymerization process, 7 g of sodium metabisulfite, 20 ml of dionized water and 3 ml of Triton X-200 was added. The final reaction mixture was kept at 60° C.–70° C. for 5 hours to complete the polymerization process. A pink emulsion polymer having a solid content of 27% was obtained. The emulsion was cooled while being stirred.

A combination of 50 ml of the emulsion polymer, 10 ml of high molecular weight polyethylene (Poly emulsion 2-67 A from Chemical Corp.) 50 ml of low molecular weight polyethylene (Poly emulsion 656 A 25 from Chemical Corp.) was used for coating the emulsion on 0.24 ml Mylar film (from DuPont). Several coating methods including doctor blade coating, kiss and rod coating were used to obtain the thermal transfer film on the Mylar substrate. Good thermal transfer properties were found by developing the image through a facsimile thermal printing head (Pitney Bowes Model 8400). The fluorescent intensity was strong and stable without fading under exposure of ultraviolet light for an extended period of time.

EXAMPLE 3

The same procedure as outlined in Example 1 was followed except the amount of each component was changed as follows:

| Ingredients | Weight |
| --- | --- |
| $H_2O$ | 200 ml |
| Triton X-305 | 30 ml |
| acrylic acid | 5 ml |
| Rhodamine 6GDN | 1.5 |
| 2-hydroxyl ethyl methacrylate | 10 ml |
| styrene | 50 ml |
| butylacrylate | 15 ml |
| methacrylamindo-propyl trimethyl ammonium chloride | 5 ml |
| potassium persulfate | 4 g |
| sodium metabisulfite | 5 g |
| polyethylene maleic anhydride | 5 g |

EXAMPLE 4

The same procedure as outlined in Example 2 was followed except the amount of each ingredient was changed as follows:

| Ingredients | Weight |
| --- | --- |
| $H_2O$ | 350 ml |
| Triton X-200 | 100 ml |
| acrylic acid | 10 ml |
| Rhodamine 6GDN | 2 g |
| 2-hydroxyl methacrylate | 18 ml |
| styrene | 80 ml |
| butyl acrylate | 40 ml |
| FLUOROL, Green Gold 084 | 0.2 g |
| ammonium persulfate | 6 g |
| sodium metabisulfite | 7 g |

EXAMPLE 5

The same procedure as outlined in Example 2 was followed except the amount of each component was changed as follows:

| Ingredients | Weight |
| --- | --- |
| $H_2O$ | 400 ml |
| Triton X-200 | 90 ml |
| acrylic acid | 10 ml |
| Rhodamine | 3 g |
| 2-hydroxyethyl methacrylate | 20 ml |
| styrene | 90 ml |
| butyl acrylate | 40 ml |
| ammonium persulfate | 6 g |
| sodium metabisulfite | 7 g |

EXAMPLE 6

The same procedure as outlined in Example 2 was followed except the ingredients were changed as follows:

| Ingredients | Weight |
| --- | --- |
| H$_2$O | 4600 ml |
| Triton X-200 | 900 ml |
| acrylic acid | 120 ml |
| Rhodamine red 6GD | 50 g |
| 2-hydroxyethyl methacrylate | 240 ml |
| styrene | 160 ml |
| N—trimethyl ammonium methacrylate chloride | 7 ml |
| styrene | 700 ml |
| butyl acrylate | 430 ml |
| acrylic acid | 50 ml |
| ammonium persulfate | 40 g |
| H$_2$O | 200 ml |
| Triton X-200 | 40 ml |
| sodium metabisulfite | 50 g |
| H$_2$O | 200 ml |
| Triton X-200 | 30 ml |

EXAMPLE 7

The same procedure as outlined in Example 2 was followed except a 12 l resin reaction flask was used and the following ingredients was used:

| Ingredients | Weight |
| --- | --- |
| H$_2$O | 4600 ml |
| Triton X-200 | 900 ml |
| acrylic acid | 120 ml |
| Rhodamine 6GD | 50 g |
| 2-hydroxyethyl methacrylate | 240 ml |
| styrene | 160 ml |
| N—trimethyl ammonium methacrylate chloride | 12 ml |
| styrene | 700 ml |
| butyl acrylate | 600 ml |
| acrylic acid | 50 ml |
| ammonium persulfate | 45 g |
| H$_2$O | 200 ml |
| Triton X-200 | 40 ml |
| sodium metabisulfite | 50 g |
| H$_2$O | 200 ml |
| Triton X-200 | 40 ml |

EXAMPLE 8

The same procedure as outlined in Example 2 was followed except a 12 l resin reaction flask was used and the following ingredients was used:

| Ingredients | Weight |
| --- | --- |
| H$_2$O | 4600 ml |
| Triton X-200 | 950 ml |
| acrylic acid | 100 ml |
| Rhodamine 6GD | 35 g |
| 2-hydroxyethyl methacrylate | 200 ml |
| styrene | 220 ml |
| styrene | 700 ml |
| butyl acrylate | 450 ml |
| ammonium persulfate | 68 g |
| H$_2$O | 220 ml |
| Triton X-200 | 45 ml |
| sodium metabisulfite | 80 g |
| H$_2$O | 200 ml |
| Triton X-200 | 35 ml |

EXAMPLE 9

The same procedure as outlined in Example 2 was followed except the ingredients were changed as follows:

| Ingredients | Weight |
| --- | --- |
| H$_2$O | 700 ml |
| Triton X-200 | 200 ml |
| acrylic acid | 20 ml |
| Basonyl red 485 | 3 g |
| Basonyl red 540 | 1.5 g |
| 2-hydroxyl methacrylate | 37 ml |
| N—trimethyl ammonium propyl methacrylate chloride | 2 ml |
| styrene | 300 ml |
| ammonium persulfate | 15 g |
| sodium bisulfite | 17 g |

In all of Examples 3 through 9 good results regarding fluorescence were obtained by following the described procedure and the listed ingredients.

What is claimed is:

1. A method for the preparation of a fluorescent thermal transfer sheet comprising:
   (a) forming a solution of a mixture comprising at least one acidic monomer having the basic formula:

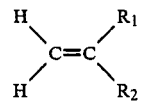

where R$_1$=H, CH$_3$ and R$_2$ is COOH, R$_3$ COOH wherein R$_3$ is C$_1$-C$_8$, and at least one basic monomer having the basic formula:

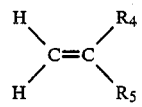

wherein R$_4$ is H, CH$_3$ and R$_5$ is OH, R$_6$ OH wherein R$_6$ is C$_1$-C$_8$ and at least one fluorescent dye;
   (b) forming an emulsion of the solution formed in step (a);
   (c) adding at least one vinyl monomer to the emulsified solution of step (b);
   (d) adding a reducing agent to an initiator
   (e) polymerizing the solution of step (c) at room temperature by adding the initiator from step (d) to said neutralized emulsion; and
   (f) coating the polymerized mixture from step (e) onto a polyester film.

2. A method according to claim 1 wherein said polyester film is Mylar.

3. A method according to claims 1 wherein the number moles of said basic monomer is equal to or greater than the total number of moles of the combination of said fluorescent dye and said acidic monomer.

4. A method for forming a fluorescent thermal transfer sheet, comprising:
   (a) forming a neutralized emulsion from a mixture comprising at least one acidic monomer and at least one fluorescent dye by (i) mixing together at least one acidic monomer having the basic formula:

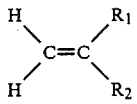

where $R_1 = H$, $CH_3$ and $R_2$ is COOH, $R_3$ COOH wherein $R_3$ is $C_1$-$C_8$ and at least one fluorescent dye; (ii) adding at least one basic monomer to the mixture of step (i), the basic monomer having the basic formula:

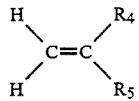

wherein $R_4$ is H, $CH_3$ and $R_5$ is OH, $R_6$ OH wherein $R_6$ is $C_1$-$C_8$; and (iii) adding an emulsifier to the mixture of step (ii) to form an emulsion;

(b) polymerizing said neutralized emulsion of step (a); and (c) coating said polymerized mixture onto a support member.

5. A method according to claim 4 wherein said support member is a polyester film.

6. A method according to claim 5 wherein said polyester film is Mylar.

7. A fluorescent thermal transfer sheet prepared by the method as described in claim 4.

* * * * *